(12) United States Patent
Frensemeier et al.

(10) Patent No.: US 11,815,115 B2
(45) Date of Patent: Nov. 14, 2023

(54) EXPANSION ANCHOR WITH PROTECTED OPTICAL CODE

(71) Applicant: Hilti Aktiengesellschaft, Schaan (LI)

(72) Inventors: Mareike Frensemeier, Buchs (CH); Wentao Yan, Buchs SG (CH); Byron-David Bell, Sargans (CH)

(73) Assignee: Hilti Aktiengesellschaft, Schaan (LI)

( * ) Notice: Subject to any disclaimer, the term of this patent is extended or adjusted under 35 U.S.C. 154(b) by 574 days.

(21) Appl. No.: 17/052,462

(22) PCT Filed: Apr. 23, 2019

(86) PCT No.: PCT/EP2019/060278
§ 371 (c)(1),
(2) Date: Nov. 2, 2020

(87) PCT Pub. No.: WO2019/211113
PCT Pub. Date: Nov. 7, 2019

(65) Prior Publication Data
US 2021/0062844 A1   Mar. 4, 2021

(30) Foreign Application Priority Data

May 3, 2018   (EP) .................................... 18170569

(51) Int. Cl.
*F16B 13/06*   (2006.01)
*F16B 1/00*   (2006.01)

(52) U.S. Cl.
CPC ............ *F16B 13/06* (2013.01); *F16B 1/0071* (2013.01)

(58) Field of Classification Search
CPC ....... F16B 13/06; F16B 13/065; F16B 1/0071
See application file for complete search history.

(56) References Cited

U.S. PATENT DOCUMENTS

| | | |
|---|---|---|
| 5,685,678 A | 11/1997 | Giannuzzi et al. |
| 6,843,628 B1 | 1/2005 | Hoffmeister et al. |
| 7,412,898 B1 | 8/2008 | Smith et al. |
| 10,584,731 B2 | 3/2020 | Gstach et al. |
| 2002/0033267 A1 | 3/2002 | Schweizer et al. |
| 2002/0187019 A1* | 12/2002 | Campbell ............... F16B 15/02 411/13 |
| 2004/0065154 A1 | 4/2004 | Kibblewhite |

(Continued)

FOREIGN PATENT DOCUMENTS

| | | |
|---|---|---|
| CN | 103280629 A | 9/2013 |
| DE | 295 11 400 U1 | 11/1995 |

(Continued)

OTHER PUBLICATIONS

PCT/EP2019/060278, International Search Report dated Aug. 2, 2019 (Two (2) pages).

*Primary Examiner* — Sarang Afzali
*Assistant Examiner* — Amanda Kreiling
(74) *Attorney, Agent, or Firm* — Crowell & Moring LLP

(57) ABSTRACT

An expansion anchor includes an anchor bolt with a rear face, a displaceable body located adjacent to the anchor bolt, and at least one wedge body located in a front region of the anchor bolt. The wedge body has a converging zone for displacing the displaceable body. An optically readable code is located at the rear face of the anchor bolt. At least one code protection protrusion projects from the anchor bolt rearwardly beyond the optically readable code.

11 Claims, 2 Drawing Sheets

(56) References Cited

U.S. PATENT DOCUMENTS

2010/0050778 A1    3/2010  Herley et al.
2014/0345110 A1*  11/2014  Schmidt .................. F16B 29/00
                                                          411/21
2017/0167139 A1    6/2017  Pregartner et al.

FOREIGN PATENT DOCUMENTS

| DE | 198 28 700 A1 | 11/1999 |
| EP | 2 803 871 A1 | 11/2014 |
| TW | 201341674 A | 10/2013 |
| TW | 201533330 A | 9/2015 |
| WO | WO 2015/067578 A1 | 5/2015 |
| WO | WO 2017/100392 A1 | 6/2017 |
| WO | WO 2017/188673 A1 | 11/2017 |

* cited by examiner

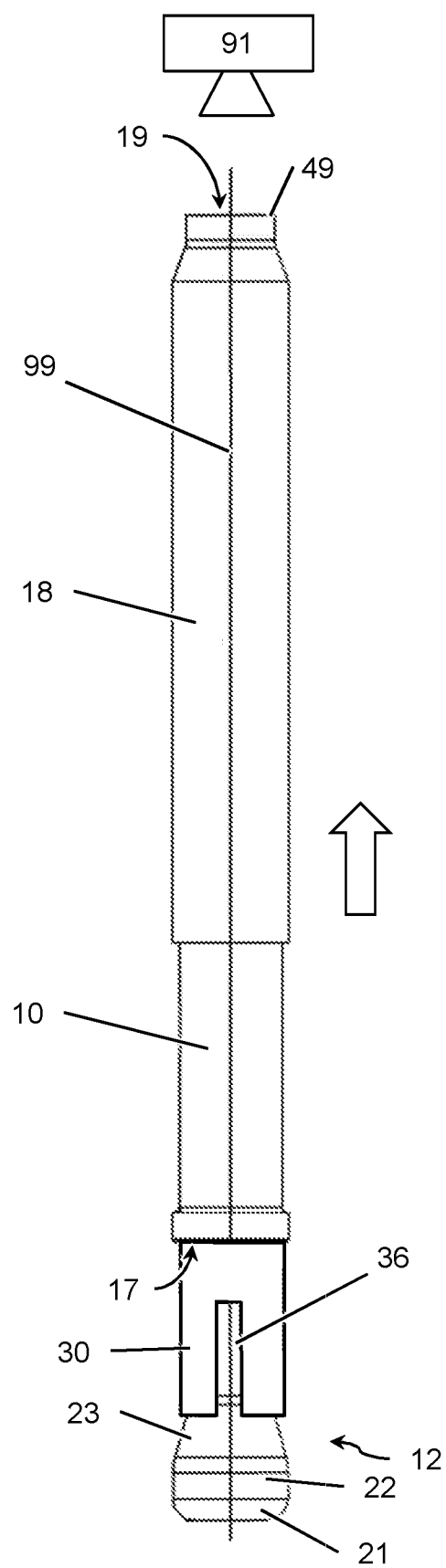
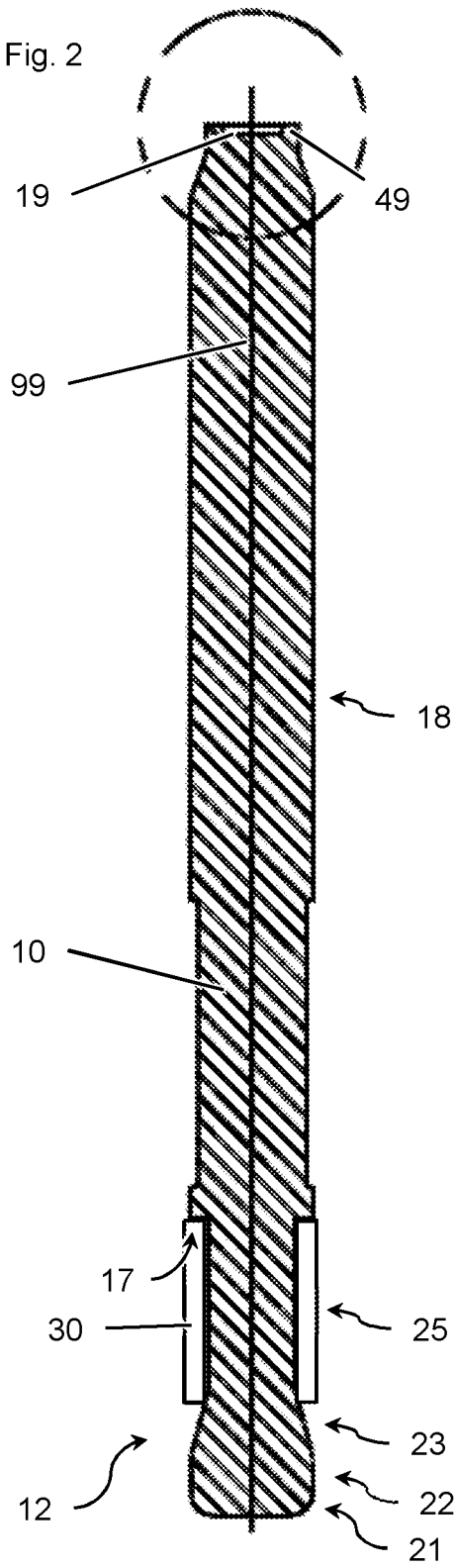

EXPANSION ANCHOR WITH PROTECTED OPTICAL CODE

CROSS REFERENCE TO RELATED APPLICATIONS

This application claims the priority of International Application No. PCT/EP2019/060278, filed Apr. 23, 2019, and European Patent Document No. 18170569.0, filed May 3, 2018, the disclosures of which are expressly incorporated by reference herein.

BACKGROUND AND SUMMARY OF THE INVENTION

The invention relates to an expansion anchor. Such an anchor has an anchor bolt with a rear face, a displaceable body located adjacent to the anchor bolt, at least one wedge body located in a front region of the anchor bolt, wherein the wedge body has a converging zone for displacing, in particular for radially displacing, the displaceable body, and an optically readable code, which is located at the rear face of the anchor bolt.

WO 15067578 A1 describes an expansion anchor of the stud type. The expansion anchor has an anchor bolt and a sleeve surrounding the anchor bolt, wherein the anchor bolt is provided with an expansion region which expands the sleeve when the anchor bolt is pulled rearwards.

US2014345110 A1 describes an expansion anchor of the undercut type. The expansion anchor has a marking on its anchor bolt, which becomes visible when the anchor bolt is moved relative to the expansion sleeve during installation, and which can then be read out by a sensor. Furthermore, the anchor bolt can be provided with an optically readable code on its rear face, which allows to identify the expansion anchor.

U.S. Pat. No. 6,843,628 B1 discloses a screw fastener comprising an externally readable information storage element, the information storage element being configured to be machine-readable and containing optically readable information, wherein the information storage element comprises at least one of a two-dimensional and a three-dimensional optically readable code.

US2004065154 A1 describes a load indicating member, which can be a screw fastener adapted for ultrasonic load measurement responsive to a bar code marked on the screw fastener, wherein the bar code contains encoded data relating to the screw fastener which comprises data for indicating a zero-load acoustic length of the screw fastener and data for indicating an acoustic signature of the screw fastener. The bar code can be a two-dimensional bar code and can be marked on the screw fastener with a laser or on a label applied to the screw fastener.

DE19828700 A1 describes a screw bolt that has an electronic storage device, which can be read out with an electronic reader. The electronic storage device can be accommodated in an aperture in the head of the screw bolt, where it is covered by a layer of plastic. The layer of plastic provides mechanical protection whilst allowing electronic data reading and writing.

EP2803871 A1 discusses an intelligent fastener having a head and an externally threaded shank for threaded engagement with a structural member. The head has a recess formed in the top surface for mounting a RFID tag with a memory containing information specific to the fastener—such as fastener identification, specified torque value and other information—an antenna for enabling bidirectional communication with a RFID tag reader, and a torque value sensor for determining the torque applied to the fastener by a fastener installation tool.

US2002033267 A1 shows an electrical hand-held power tool, comprising a transceiver for reading-in identification data contained in identification means associated with at least one fastening element. The fastening element can be an anchor and the identification means can be a readable bar code.

It is an object of the present invention to provide an optically labelled expansion anchor that is, whilst being easy to manufacture, particularly reliable to use.

An inventive expansion anchor is characterized in that it has at least one code protection protrusion, which projects, from the anchor bolt, rearwardly beyond the optically readable code, in particular in order to protect the optically readable code from hammer blows and scratches during handling.

The invention is based on the finding that the percentage of false readings/no-readings of the optically readable codes can be surprisingly high when the optically readable codes are applied to expansion anchors. The invention has linked this finding to the way expansion anchors are usually installed. Whilst screw fasteners are typically installed with more-or-less constant axial force, expansion anchors are often forcefully hammered into the borehole by axial hammer blows. However, since these hammer blows usually strike the rear face of the anchor bolt, there is a possibility that the rear face gets scratched or even deformed, and with it also the optically readable code, potentially resulting in false readings. In order to resolve this issue, the invention proposes to protect the optically readable code by geometrical means, namely by the code protection protrusion. This code protection protrusion projects from the anchor bolt and ends further to the rear than the optically readable code. Therefore, the code protection protrusion can provide a force bypass, keeping the energy of the hammer blows away from the optically readable code and protecting the optically readable code from detrimental scratching or deformation, thereby providing particularly good read-out reliability without much manufacturing effort.

The code protection protrusion projects rearwardly beyond the optically readable code, which in particular implies that the code protection protrusion projects further to the rear, i.e., in the direction pointing away from the front region, than the optically readable code. The optically readable code is optically accessible on the outside of the anchor, i.e., it is not covered, so that it can be read out, for example, by a sensor. Preferably, the code protection protrusion is radially offset from the optically readable code, which allows particularly efficient optical access of the optically readable code.

Preferably, the displaceable body is an expansion sleeve, which surrounds the anchor bolt, in particular around the longitudinal axis. Preferably, the expansion sleeve is a single piece. However, it could also consist of several individual segments, which are for example held in a bolt-surrounding arrangement by means of a rubber band or by snap-on mechanisms. The expansion sleeve can have at least one slit, originating from the front end of the expansion sleeve.

Preferably, the anchor bolt, the displaceable body and/or the wedge body are steel parts. They can for example comprise carbon steel or stainless steel.

The anchor bolt is an elongate body. The wedge body and the anchor bolt are, in particular, connected to transfer tensile forces. The anchor bolt can have, in a rear region of the anchor bolt, a tension-introducing structure. The tension-introducing structure is for introducing tensile forces into the anchor bolt. The tension-introducing structure can for example be a thread, in particular an outer thread, provided on the anchor bolt. The tension-introducing structure can for example be a thread, in particular an outer thread, provided on the anchor bolt. The tension-introducing structure can for example also be a head, that forms a maximum cross-section, or a bayonet-type lock.

The converging zone of the wedge body serves to radially displace the displaceable body with respect to the longitudinal axis, in particular away from the longitudinal axis, when the wedge body is moved rearward with respect to the displaceable body. Preferentially, the converging zone of the wedge body serves to radially expand the expansion sleeve when the wedge body is moved rearward with respect to the expansion sleeve. In the converging zone, the wedge body converges, on its lateral surface, towards the rear of the anchor bolt, which means it converges towards the rear face of the anchor bolt and/or towards the tension-introducing structure, wherein the focus of convergence can preferably be the longitudinal axis. This in particular implies that the radial distance of the lateral surface of the wedge body from the longitudinal axis becomes smaller towards the rear of the wedge body. The wedge body can have additional zones, for example a preferably cylindrical transition zone and/or a tip zone. The converging zone can for example be conical, or can have a more complex, for example a convex or concave shape. In particular, the converging zone forms a wedge for the displaceable body.

The rear face is a surface which limits the anchor bolt at the rear end of the anchor bolt. Preferably, the longitudinal axis intersects the rear face, more preferably at a right angle. The rear face can preferably be flat.

Where the term "longitudinal axis" is used, this should, in particular, refer to the longitudinal axis of the anchor bolt, which is often also the longitudinal axis of the expansion anchor. In accordance with the usual definition, the "longitudinal axis" can in particular be the axis that runs in the longitudinal direction, i.e., in the long direction of the elongate anchor bolt. Where the terms "radially", "axially" or "circumferentially" are used, this is should in particular be understood with respect to the longitudinal axis of the anchor bolt.

The code protection protrusion could be formed on a separate cap which is for example plugged onto the anchor bolt. However, it is particularly preferred that the code protection protrusion and the anchor bolt are monolithic, i.e., that the code protection protrusion and the anchor bolt form one piece. This embodiment can further facilitate manufacturing and/or can prevent unwanted loss of the code protection protrusion in a particular reliable way.

Preferably, the code protection protrusion comprises metal, in particular steel, due to the mechanical strength of these materials. The code protection protrusion can for example be formed using cold forming or machining.

It is particularly preferred that the code protection protrusion forms at least a sector of an annulus surrounding the optically readable code. The fact that the code protection protrusion forms "at least a sector" of an annulus is to be understood that the code protection protrusion either forms a sector of an annulus only, i.e., that it has a sector angle<360°, or that it forms a full, continuous annulus. This allows particularly effective protection of the optically readable code. Preferably, the expansion anchor has several code protection protrusions, each of which project, from the anchor bolt, rearwardly beyond the optically readable code, wherein each code protection protrusion forms a sector of an annulus surrounding the optically readable code. Taken together, the code protection protrusions can form a discontinuous annulus surrounding the optically readable code. In addition to the mentioned code protection protrusions, the expansion anchor might also have secondary code protection protrusions that do not contribute to the mentioned annulus.

It is more particularly preferred that the code protection protrusion forms an annulus, particularly a continuous annulus, surrounding the optically readable code. This allows particularly effective protection of the optically readable code and can be particularly easy to manufacture. The optically readable code is embedded in the annulus. In other words, the annulus forms a cavity, in which the rear face of the anchor bolt and the optically readable code are located. The expansion anchor might also have secondary code protection protrusions that do not contribute to the mentioned annulus.

Advantageously, the annulus has constant height and/or constant radial width. This can further facilitate manufacturing, and can further improve performance. In the present case, the height is measured in the axial direction and preferably with respect to the rear face of the anchor bolt, and/or the radial width is measured along a radial line originating from the longitudinal axis.

According to another preferred embodiment of the invention, the code protection protrusion has a maximum height ($h_{max}$) that is greater than 0.4 mm, preferably greater than 0.5 mm. This means $h_{max}$>0.4 mm, preferably $h_{max}$>0.5 mm. If the code protection protrusion is an annulus, this can imply that the optically readable code is located in a cavity that is deeper than 0.4 mm or 0.5 mm, respectively. This can provide particularly good protection at the conditions that are typically used for expansion anchors. The maximum height is measured in the axial direction and preferably with respect to the rear face of the anchor bolt.

Advantageously, the code protection protrusion has a maximum radial width ($w_{max}$) that is greater than 0.5 mm, i.e., $w_{max}$>0.5 mm. Having a relatively large width can efficiently prevent unwanted deformation of the rearward region of the anchor bolt during hammering-in and can thereby further improve the installation process. Preferably, maximum radial width is measured along a radial line originating from the longitudinal axis.

The optically readable code is preferably a barcode, more preferably an at least two-dimensional barcode, most preferably a two-dimensional barcode. Due to the relatively high density of information, the inventive improvement can be particularly effective in these cases. The optically readable code can for example be a Data Matrix code or a QR Code. The optically readable code can for example be applied by laser marking and/or inkjet printing. The optically readable code can be provided directly on the rear face of the anchor bolt or it can be provided on a label, which label is positioned on the rear face of the anchor bolt.

The expansion anchor can be a so-called sleeve-type expansion anchor. Expansion anchors of this type have relatively long expansion sleeves, reaching to the rear end of the anchor bolt, and the wedge body is threaded to the anchor bolt, wherein rearwards displacement of the wedge body relative to the expansion sleeve is achieved by rotating the anchor bolt in the wedge body.

It is, however, particularly advantageous that the anchor bolt has a forwardly-facing shoulder for abutment against the displaceable body and/or for advancing the displaceable body into the borehole. These types of expansion anchors are often termed stud-type expansion anchors. Due to their design, stud-type expansion anchors often require a relatively high number of hammer blows during installation, and therefore, the invention can be particularly effective in this case. Preferably, the forwardly-facing shoulder can be located in front of the tension introducing structure and/or in the forward half of the anchor bolt. In addition to the forwardly-facing shoulder, the expansion anchor can be provided with an anchor nut screwed onto the tension introducing structure or with a head forming the tension introducing structure. The shoulder and the anchor bolt are preferably monolithic, in particular for good forward force transfer. Stud-type expansion anchors usually have relatively short expansion sleeves, and rearwards displacement of the wedge body relative to the displaceable body is achieved by axial movement of the anchor bolt.

The wedge body can be tightly fixed to the anchor bolt, in particular if the expansion anchor is a stud-type expansion anchor. It is particularly preferred that the wedge body and the anchor bolt are monolithic, i.e., that they form one piece.

In this text, reference is repeatedly made to the properties of "at least one code protection protrusion". If, according to the invention, there is provided a plurality of code protection protrusions then at least one of the plurality of code protection protrusions can have these properties, or all of the plurality of code protection protrusions can have these properties, unless explicitly stated otherwise.

The invention also encompasses the intended use of the expansion anchor. In particular, the invention also relates to a method for using an inventive expansion anchor, in which, in a read-out step, the optically readable code is read out using a sensor. The sensor is preferably an electronic sensor. The sensor can be for example part of a smartphone or of a power tool for installing the expansion anchor. In the latter case, the power tool can read the stored information and adapt its configurations in order to suit the identified expansion anchor. The link between anchor and power tool can facilitate the installation process.

Preferably, in a moving step, the wedge body is moved rearwards relative to the displaceable body, thereby radially displacing the displaceable body. Accordingly, the expansion anchor is installed as intended. Moving the wedge body rearwards relative to the displaceable body can preferably be achieved by pulling the anchor bolt, with the wedge body attached, out of the hole or/and by moving the wedge body rearwards relative to the anchor bolt.

The read-out step can take place before or after the moving step. Since the optically readable code is protected during installation by the code protection protrusion, it is particularly preferred that the read-out step is performed after the moving step.

The code protection protrusion protects the optically readable code, but the optically readable code remains accessible for optical reading.

Features which are described here in context with the expansion anchor can also be used for the method for using the expansion anchor, and features that are described here in context with the method for using the expansion anchor can also be used for the expansion anchor itself.

The invention is explained in greater detail below with reference to preferred exemplary embodiments, which are depicted schematically in the accompanying drawings, wherein individual features of the exemplary embodiments presented below can be implemented either individually or in any combination within the scope of the present invention.

BRIEF DESCRIPTION OF THE DRAWINGS

FIG. 1 is a side view of an inventive expansion anchor;
FIG. 2 is a longitudinal section of the expansion anchor of FIG. 1.

DETAILED DESCRIPTION OF THE DRAWINGS

Figure 3:
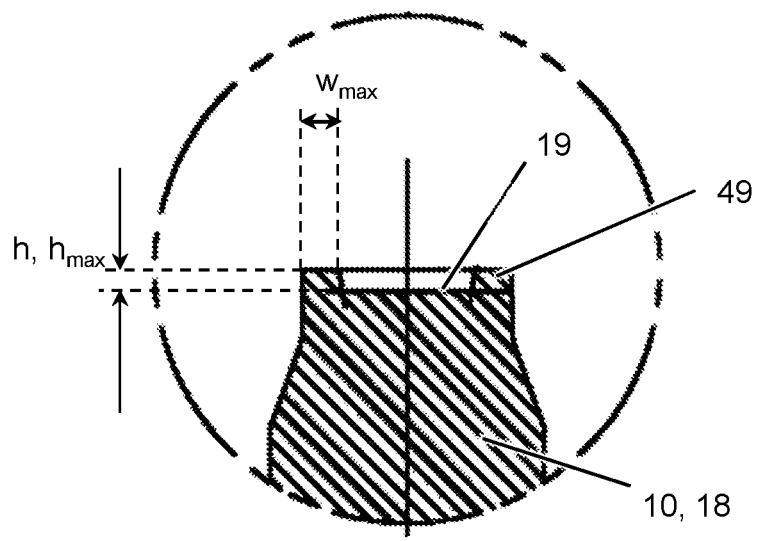
FIG. 3 is a cut-out of FIG. 2 in the rear region of the expansion anchor encircled in FIG. 2.
Figure 4:
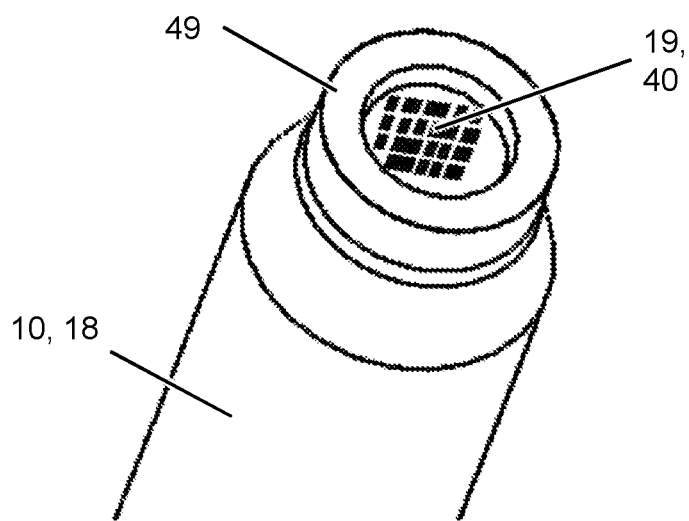
FIG. 4 is an isometric view of the rear region of the expansion anchor of FIG. 1.

The expansion anchor shown in the Figures comprises an elongate anchor bolt 10 defining a longitudinal axis 99, a displaceable body 30, and a wedge body 12 for the displaceable body 30, which wedge body 12 is provided on the anchor bolt 10 in the vicinity of the front end of the anchor bolt 10. The displaceable body 30 is an expansion sleeve which surrounds the anchor bolt 10. It is provided with a plurality of slits 36, which originate from the front end of the displaceable body 30 and extend towards the rear end of the displaceable body 30.

As illustrated in particular in FIG. 2, the wedge body 12 has a converging zone 23 designed for radially expanding the displaceable body 30, i.e., the expansion sleeve, when the wedge body 12 is drawn into the displaceable body 30 in the rearwards direction, i.e., when the displaceable body 30 is moved forwards relative to the wedge body 12 onto the wedge body 12. For this purpose, the lateral surface of the wedge body 12 converges towards the rear of the anchor bolt 10, i.e., it converges towards the displaceable body 30, at least before the expansion anchor is installed. In the present example, the wedge body 12 lateral surface is conical in the converging zone 23, with a focus of convergence on the longitudinal axis 99. However, this is merely an example and other converging designs are also possible.

In the present example, the wedge body 12 also has a transition zone 22, which is located forwards of and adjacent to the converging zone 23, and a tip zone 21, which is located forwards of and adjacent to the transition zone 22. In the transition zone 22, the rearward convergence is smaller as compared to the converging zone 23 or the rearward convergence is even zero, but preferably not reverse, i.e., it is not a forward convergence. In the present example, convergence is absent, i.e., zero, in the converging zone 23 and the wedge body 12 has a cylindrical lateral surface in the converging zone 23, in particular cylindrical with a circular base. In the tip zone 21, the lateral surface of the wedge body 12 converges towards the front end of the anchor bolt 10.

The anchor bolt 10 has a neck 25, which is located adjacent to and rearwards of the wedge body 12. The displaceable body 30 at least partly surrounds this neck 25, at least before installation the expansion anchor. At the neck 25, the diameter of the anchor bolt 10 can be minimal.

In the present embodiment, the expansion anchor is of the stud type. The anchor bolt 10 has, at the rearward end of the neck 25, a shoulder 17 facing forwards for axially engaging the displaceable body 30 and for advancing the displaceable body 30 forwards. The shoulder 17 and the anchor bolt 10 are monolithic. In the present case, the wedge body 12 is, by way of example, also monolithic with the anchor bolt 10.

In a rear region of the anchor bolt 10, the anchor bolt 10 is provided with a tension-introducing structure 18, here in the form of an outer thread provided on the anchor bolt 10.

At its rear end, the anchor bolt 10 has a, preferably flat, rear face 19 that faces rearwardly, wherein the longitudinal axis 99 penetrates the rear face 19 at a right angle. The expansion anchor has an optically readable code 40, a two-dimensional barcode in the present case, which is located at the rear face 19 of the anchor bolt 10, and which can be read out by a sensor 91 located rearwards of the anchor bolt 10.

In order to protect the optically readable code 40 from hammer blows, the expansion anchor has a code protection protrusion 49, which projects, from the anchor bolt 10, rearwardly over the optically readable code 40, i.e., the code protection protrusion 49 extends further to the rear than the optically readable code 40 and the rear face 19. The code protection protrusion 49 and the anchor bolt 10 are monolithic.

In the present example, the code protection protrusion 49 has the shape of a continuous annulus of constant height h. The maximum height $h_{max}$ of the annular-shaped code protection protrusion 49, which equals the constant annulus height h, is preferably greater that 0.5 mm, more preferably greater than 0.8 mm. Both the height h and the maximum height $h_{max}$ are measured in the axial direction, i.e., in the direction of the longitudinal axis 99, starting from the rear face 19 as the reference plane. The code protection protrusion 49 has a maximum radial width $w_{max}$ that is greater than 0.8 mm.

When the expansion anchor is installed the expansion anchor is inserted, front end first, into a hole in a substrate. This is achieved by hammer blows applied to the rear of the anchor bolt 10. The hammer blows are taken up and transferred to the anchor bolt 10 by the code protection protrusion 49. Since the code protection protrusion 49 extends rearwardly from the rear face 19 of the anchor bolt 10, the code protection protrusion 49 protects the optically readable code 40 applied to the rear face 19 from the hammer blows.

Subsequently, the wedge body 12 is drawn into the front-end region of the displaceable body 30 by pulling the anchor bolt 10 together with the wedge body 12 rearwardly—i.e., in the direction of the transparent arrow shown right of the anchor bolt 10 in FIG. 1—in particular by tightening a nut provided on the tension-introducing structure 18 of the anchor bolt 10. This radially expands the sleeve-shaped displaceable body 30, thereby anchoring the expansion anchor in the substrate.

Since the code protection protrusion 49 does not rearwardly cover the optically readable code 40, i.e., since the optically readable code 40 is optically accessible at the outside of the expansion anchor, the optically readable code 40 can be read-out both before installation and/or after installation of the expansion anchor by a sensor 91 that is located rearwards of the anchor bolt 10.

The invention claimed is:

1. An expansion anchor, comprising:
    an anchor bolt with a rear face;
    a displaceable body disposed adjacent to the anchor bolt;
    a wedge body disposed in a front region of the anchor bolt, wherein the wedge body has a converging zone for displacing the displaceable body;
    an optically readable code disposed at the rear face of the anchor bolt; and
    a code protection protrusion which projects from the anchor bolt rearwardly beyond the optically readable code.

2. The expansion anchor according to claim 1, wherein the code protection protrusion and the anchor bolt are monolithic.

3. The expansion anchor according to claim 1, wherein the code protection protrusion forms a sector of an annulus that surrounds the optically readable code.

4. The expansion anchor according to claim 1, wherein the code protection protrusion forms an annulus that surrounds the optically readable code.

5. The expansion anchor according to claim 4, wherein the annulus has a constant height.

6. The expansion anchor according to claim 1, wherein the code protection protrusion has a maximum height that is greater than 0.4 mm.

7. The expansion anchor according to claim 1, wherein the code protection protrusion has a maximum radial width that is greater than 0.5 mm.

8. The expansion anchor according to claim 1, wherein the optically readable code is an at least two-dimensional barcode.

9. The expansion anchor according to claim 1, wherein the anchor bolt has a forwardly-facing shoulder for advancing the displaceable body into a borehole.

10. A method for using the expansion anchor according to claim 1, comprising the step of:
    reading the optically readable code using a sensor.

11. The method according to claim 10 further comprising the steps of moving the wedge body rearwards relative to the displaceable body and radially displacing the displaceable body by the step of moving.

\* \* \* \* \*